US007935237B2

(12) United States Patent
Carrier et al.

(10) Patent No.: US 7,935,237 B2
(45) Date of Patent: May 3, 2011

(54) ELECTRICAL TREATMENT FOR OIL BASED DRILLING OR COMPLETION FLUIDS

(76) Inventors: Michelle Bridget Carrier, London (GB); Gerald Henry Meeten, Hertfordshire (GB)

( * ) Notice: Subject to any disclaimer, the term of this patent is extended or adjusted under 35 U.S.C. 154(b) by 1421 days.

(21) Appl. No.: 10/517,332

(22) PCT Filed: Jul. 2, 2004 (Under 37 CFR 1.47)

(86) PCT No.: PCT/GB2004/002863
§ 371 (c)(1), (2), (4) Date: Apr. 12, 2006

(87) PCT Pub. No.: WO2005/017307
PCT Pub. Date: Feb. 24, 2005

(65) Prior Publication Data

US 2007/0235336 A1 Oct. 11, 2007

(30) Foreign Application Priority Data

Aug. 12, 2003 (GB) .................................. 0318840.6

(51) Int. Cl.
*B01D 17/06* (2006.01)

(52) U.S. Cl. ....................................................... 204/560

(58) Field of Classification Search ................... 204/560
See application file for complete search history.

(56) References Cited

U.S. PATENT DOCUMENTS

| | | | | |
|---|---|---|---|---|
| 2,174,938 | A * | 10/1939 | Dillon et al. | 204/513 |
| 3,799,857 | A | 3/1974 | Franse | |
| 3,928,158 | A | 12/1975 | Fritsche et al. | |
| 3,951,771 | A * | 4/1976 | Burger | 204/561 |
| 4,116,790 | A * | 9/1978 | Prestridge | 204/563 |
| 4,170,529 | A | 10/1979 | Freeman | |
| 4,269,681 | A | 5/1981 | Watson et al. | |
| 4,402,807 | A * | 9/1983 | Merchant, Jr. | 204/561 |

FOREIGN PATENT DOCUMENTS

| | | |
|---|---|---|
| WO | WO-95/90726 A | 11/1995 |
| WO | WO-9530726 | 11/1995 |

OTHER PUBLICATIONS

PCT/GB2004/002863: PCT Written Opinion of the International Searching Authority, 7 pages, Mailed Feb. 23, 2006.

International Preliminary Report dated Feb. 23, 2006; International Application No. PCT/GB04/002863 (8 pages).

* cited by examiner

*Primary Examiner* — Arun S Phasge
(74) *Attorney, Agent, or Firm* — M-I L.L.C.

(57) ABSTRACT

A method of removing particulate solids from an oil based drilling or completion fluid (1) is disclosed. The method involves exposing the fluid to an electric field to electrically migrate particulate solids suspended therein, and collecting the migrated particulate solids to remove them from the fluid.

20 Claims, 5 Drawing Sheets

ELECTRICAL TREATMENT FOR OIL BASED DRILLING OR COMPLETION FLUIDS

This application claims priority under 35 USC §371 of International application number PCT/GB2004/002863, filed 22 Jul. 2004, which claims priority to United Kingdom (GB) application number 0318840.6, filed 12 Aug. 2003.

FIELD OF THE INVENTION

The present invention relates to an electrical treatment for oil based drilling or completion fluids.

BACKGROUND

In the process of rotary drilling a well, a drilling fluid or mud is circulated down the rotating drill pipe, through the bit, and up the annular space between the pipe and the formation or steel casing, to the surface. The drilling fluid performs different functions such as removal of cuttings from the bottom of the hole to the surface, to suspend cuttings and weighting material when the circulation is interrupted, control subsurface pressure, isolate the fluids from the formation by providing sufficient hydrostatic pressure to prevent the ingress of formation fluids into the wellbore, cool and lubricate the drill string and bit, maximize penetration rate etc.

The required functions can be achieved by a wide range of fluids composed of various combinations of solids, liquids and gases and classified according to the constitution of the continuous phase mainly in two groupings: aqueous drilling fluids, and oil based drilling fluids.

Aqueous fluids are the most commonly used drilling fluid type. The aqueous phase is made up of fresh water or, more often, of a brine. As discontinuous phase, they may contain gases, water-immiscible fluids such as diesel oil which form an oil-in-water emulsion, and solids including clays and weighting material such as barite. The properties are typically controlled by the addition of clay minerals, polymers and surfactants.

In drilling water-sensitive zones such as reactive shales, production formations, or where bottom hole temperature conditions are severe or where corrosion is a major problem, oil based drilling fluids are preferred. The continuous phase is typically a mineral or synthetic oil which may be alkenic, olefenic, esteric etc. Such fluids also commonly contain water or brine as discontinuous phase to form a water-in-oil or invert emulsion. Generally they furthermore contain a solid phase, which is essentially similar to that of aqueous fluids, and additives for the control of density, rheology and fluid loss. The invert emulsion is formed and stabilized with the aid of one or more specially selected emulsifiers.

Oil based drilling fluids also typically contain oil-soluble surfactants that facilitate the incorporation of water-wet clay or non-clay formation minerals, and hence enable such minerals to be transported to surface equipment for removal from circulation before the fluid returns to the drillpipe and the drillbit. The largest formation particles are rock cuttings, of size typically larger than 0.1-0.2 mm, removed by shale-shaker screens at the surface. Smaller particles, typically larger than about 5 μm, will pass through the screens, but can be removed by centrifuge.

Oil based drilling fluids have been used for many years, and their application is expected to increase, partly owing to their several advantages over water based drilling fluids, but also owing to their ability to be re-used and re-cycled, so minimizing their loss and their environmental impact.

As mentioned above, during drilling, formation particles become incorporated into the drilling fluid. Unless these are removed, they eventually move the fluid's properties, particularly the rheological parameters, out of the acceptable range. However, formation particles that are colloidal in size (less than about 5 μm) are more difficult to remove than the larger particles. A longer centrifuge run-time would be sufficient to remove the colloidal particles if the fluid were merely viscous, but the quiescent drilling fluid is usually required to behave as a gel to support cuttings in periods without circulation. Such a fluid will have a gel strength, and will behave as a non-Newtonian, shear-thinning fluid in which the viscosity at low shear rates is very large compared with the viscosity at the circulation rate.

Gel strengths typical of oil based fluids (1-10 Pa) can be shown to support particles of less than a few microns in size indefinitely against the centrifugal force typical of oilfield centrifuges, which then have no effect regardless of the time they run. Further, owing to their large specific surface area, colloidal-sized particles have a disproportionate effect on the rheology of a fluid. Moreover, as more colloidal particles become part of the fluid, the gel strength will generally increase. Thus as more colloidal particles are incorporated in the drilling fluid, the upper particle size that can be supported by the gel, and hence unremoved by the centrifuge, also increases. Increasing quantities of colloidal particles are detrimental to other aspects of a fluid's performance, particularly those engineering parameters important for efficient drilling.

Thus, in practice, the process of increasing colloidal concentration and decreasing treatment efficiency tends to continue until engineering parameters depart from their acceptable ranges. In particular, both the engineering rheology parameters plastic viscosity (PV) and yield point (YP) (API 1988) must be kept within bounds for efficient drilling. As drilling proceeds, and possibly also as the fluid is moved from one job to another, the driller can eventually find that PV and YP increase beyond their upper limits until the fluid becomes unusable for drilling and untreatable by centrifuge.

Typically PV should be in the range 20 to 100, and YP should lie between 15 to 55. Strictly, the PV and YP of drilling fluids are defined by the API-defined rheometer used to measure them, but they can be related to more generally used parameters by the Bingham Plastic rheology model in which the shear stress SS (in Pa) and shear rate SR (in reciprocal seconds or 1/s) are related by:

$$SS=BYS+BPV\times SR$$

where BYS is the Bingham yield stress in Pa and BPV is the Bingham plastic viscosity in Pa s. The oilfield unit YP as measured by the API method is given by YP=1.96×BYS(Pa). Likewise, the oilfield unit PV=1000×BPV(Pa s).

Similar considerations apply to oil based completion fluids.

SUMMARY OF THE INVENTION

In general terms, the present invention relates to an electrical treatment for oil based drilling or completion fluids whereby the particulate structure of the fluid and/or a filter cake or sedimentary bed formed from the fluid may be altered to give advantageous fluid, cake or bed properties. The drilling or completion fluids of the present invention generally have densities of at least 1100 kg/m$^3$, and more preferably 1500 kg/m or 2000 kg/m.

One effect of applying a spatially uniform field, of e.g. 100 V mm$^{-1}$, to an oil based fluid, is to cause charged colloidal particles to migrate to an electrode at which they concentrate and collect as a removable deposit. This phenomenon is well-known as electrophoresis (Delgado 2002), particularly in aqueous or highly-conductive fluids. U.S. Pat. No. 4,323,445 proposes an apparatus for electrokinetically separating water based drilling mud into liquid and solid phases. However, as far as we are aware, electrophoresis has not been exploited for the removal of colloidal or fine particles from oil based drilling or completion fluids, or any other similar non-aqueous application.

U.S. Pat. No. 5,308,586 describes an electrostatic separator for removing very dilute fine particles from oils. However, in that application (i) the oil feed was relatively clean and free from the high concentrations of the weighting agents and emulsified brine typically found in drilling fluids, and (ii) the field was applied to the feed oil amongst a bed of glass beads.

Also it is known in the petroleum industry to apply very high electric fields for coalescing dispersed water droplets dispersed in oil (Thornton 1992, Eow et al. 2001). However, in general, the field strengths we propose are less than those at which emulsion droplets in an oil based drilling or completion fluid would coalesce to form continuous and electrically-conductive chains. Such fields, giving dielectric breakdown, are routinely measured in the API Electrical Stability Test (API 1988) for oil based drilling or completion fluids as a measure of emulsion stability and sufficiency of emulsifier.

Thus a first aspect of the present invention provides a method of removing particulate solids from an oil based drilling or completion fluid, comprising:

- exposing the fluid to an electric field to electrically migrate particulate solids suspended therein, and
- collecting the migrated particulate solids to remove them from the fluid.

Typically, but not exclusively, the drilling or completion fluid comprises a water-in-oil emulsion. For such a fluid, the amount of water (in terms of the water to oil volume ratio) may be at least 5:95, and more preferably at least 30:70 or 50:50. The strength of the electric field is preferably lower than that required to coalesce the water droplets of the emulsion. The water generally contains a dissolved salt, i.e. the water is a brine.

Preferably, the strength of the electric field is less than 100,000 V/m, more preferably it is less than 10,000 V/m.

Preferably, the strength of the electric field is greater than 10 V/m, more preferably it is greater than 100 V/m.

In certain embodiments, the electric field is substantially uniform. However, in other embodiments the electric field is spatially non-uniform. One effect of non-uniform fields is well-known as dielectrophoresis (Pohl 1978) whereby the field induces an electric dipole moment in an uncharged particle of different electrical permittivity from the surrounding liquid. The particle is then caused by the field gradient to migrate towards the high-field region where it can be collected. An advantage of the use of a non-uniform field is, therefore, that the migrating particles are not required to possess an electrical charge.

The PV and/or YP of the drilling or completion fluid is typically reduced as a result of the collection of the particulate solids.

Generally, the fluid contains clay particles and/or weighting agent (e.g. barite) particles.

The particulate solids in the fluid may occupy at least 5 vol. % and preferably at least 15 vol. % of the total fluid.

The drilling or completion fluid may be a shear-thinning fluid which forms a gel when quiescent. Thus the method allows colloidal particles to be removed from such a fluid.

In preferred embodiment electrodes used to generate the electrical field are combined with a deposit removal system that either collects deposits from a location in the vicinity of the electrode or actively removes deposits from the surface of the electrode. The removal system may be operating continuously or as a batch process. In the latter case, it is preferred to operate the removal system during periods in which the electric field is switched off.

The method is further preferably applied such that voltage applied and current are proportional, hence that the fluid behaves as a conventional resistor following Ohm's law.

The method may further comprise heating the fluid to enhance the collection of particulate solids. Preferably the fluid is heated to a temperature of at least 25° C., more preferably at least 50° C., and even more preferably at least 75° C.

A further aspect of the invention provides a method of recycling an oil based drilling or completion fluid by performing the method of the first aspect.

The method of recycling may include the step of using a centrifuge or hydrocyclone to remove other particulate solids from the fluid. This step may be performed before or after the electrical treatment.

BRIEF DESCRIPTION OF THE DRAWINGS

The invention will now be described in more detail, with reference to the drawings in which.

DETAILED DESCRIPTION

Tests have been performed on oil based drilling fluids in which a steady electrical field was applied to a sample of oil based mud to remove solid particles by depositing them on one electrode, leaving the drilling fluid depleted of such particles. In most cases the deposit was formed on the negative electrode, which suggests that the particles were positively-charged, but the process is equally applicable to the treatment of fluids containing negatively-charged particles.

Drilling Fluids

Initial tests were conducted with field samples in which the base oil was mineral oil. The field samples were a conventional invert emulsion based on a Versaclean™ oil based mud (OBM) formulation. These are tightly emulsified, temperature-stable, invert-emulsion, oil based drilling fluids. The following components are found in such formulations: primary and secondary emulsifiers, blends of liquid emulsifiers, wetting agents, gellants, fluid stabilizing agents, organophilic clay (amine treated bentonite), $CaCl_2$ brine, filtration control additives and barite as a weighting agent. The field sample drilling fluids were aged by circulation at geothermal temperatures, and contained some fine particles, typically clay, resulting from the drilling process.

Further tests were also conducted on field samples of a Versaport™ OBM system. The Versaport systems have elevated low shear rate viscosities. Versaport is either a conventional or relaxed filtrate system, the relaxed filtrate system comprising: primary emulsifier, surfactant, oil-wetting agents, lime, viscosifiers and gelling agents, organophilic clay, $CaCl_2$ brine and barite.

Apparatus and Tests on Versaclean

Figure 1:
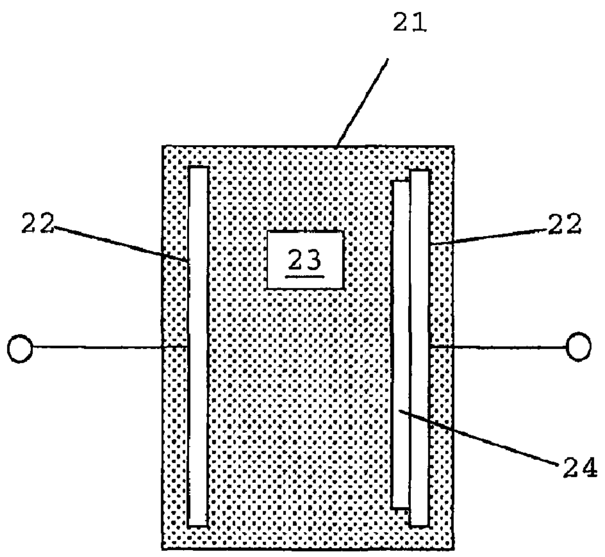
FIG. 1 shows schematically a simple electrophoretic separating assembly.

Qualitative tests were made on the field-fluid Versaclean OBM samples, using a simple electrophoretic separating assembly shown schematically in FIG. 1. The assembly had a container 21 for two parallel stainless steel plates 22 and the sample 23 to be tested. The plates were connected to a constant DC voltage supply of about 200 V, so that one electrode was negative and the other positive, and a field strength of about 1000 V/cm was generated. After a few minutes oil appeared close to the electrodes, and after about 20 min the assembly was dismantled. The negative electrode was coated with about 0.5 mm of deposit 24, the other remaining deposit-free but coated thinly with drilling fluid. With this arrangement of plates, the field was kept spatially-uniform by means of a guard electrode (not shown).

Thus the presence of a uniformly-thick deposit over the negative electrode was evidence that deposition resulted from electrophoresis of positive particles, rather than dielectrophoresis which requires a field gradient.

Figure 2:
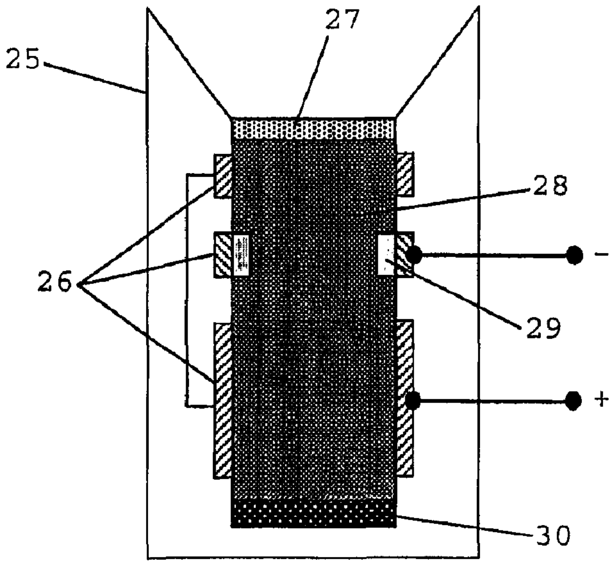
FIG. 2 shows schematically an apparatus used for quantitative electrophoretic separating tests.

An apparatus used for quantitative tests is shown schematically in FIG. 2. The apparatus consisted of a cylindrical epoxy conductivity cell 25 of internal diameter about 20 mm, having three axially spaced annular carbon electrodes 26. The electrodes were connected to a constant voltage supply so that the center electrode was negatively charged and the other two were positively charged. Versaclean was poured into this cell and a constant voltage applied. A layer of oil 27 was observed to form at the surface of the mud 28 and an electro-deposit 29 collected on the negative electrode. A barite layer 30 settled at the bottom of the cell. The oil is believed to rise to the surface owing to a weakening of the gel as fine particles migrated from the center of the cell to form the deposit. The cell was weighed empty, and then after the treated drilling fluid (effluate) was poured out. The increment of weight comprised the weight of the deposit and the residual fluid unremoved by gravity that adhered to the inside of the cell. The API rheological parameters PV and YP, and the API 100 PSI fluid loss, were measured for the effluate poured from the cell.

Figure 3:
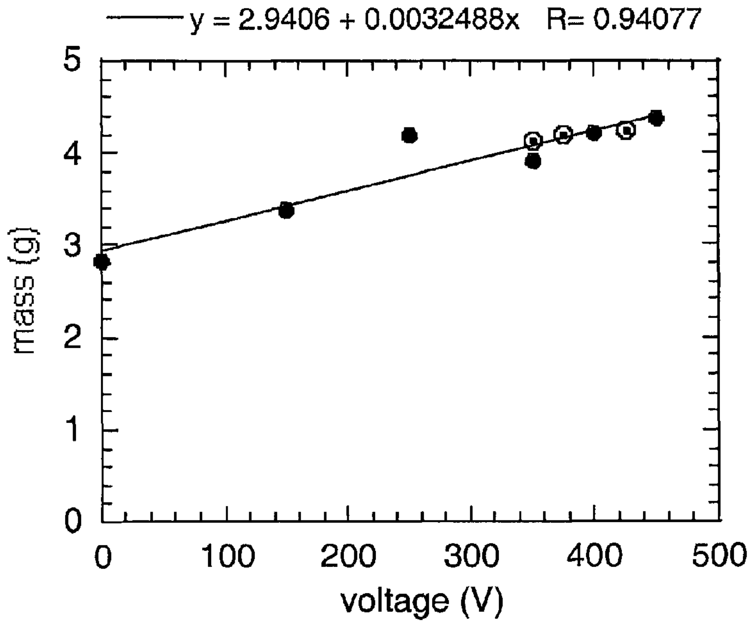
FIG. 3 is a graph of mass of deposit against voltage.

The effect of voltage and time on the mass of the deposit is shown in FIG. 3. Closed circles show the electrodeposit mass after 25 min. Open circles show the mass deposited after 40 minutes corrected to 25 min assuming the electrodeposit was directly proportional to the time of voltage application. The collected data show that the mass deposited was proportional to voltage and time.

A variety of different oil based drilling fluids were then investigated with the epoxy cell method, in which a voltage of 200 V was applied for a duration of 25 minutes. These fluids were two different field samples of Versaclean (Versaclean 1 and Versaclean 2), and a further sample of Versaclean 2 which has been centrifuged at 3000 rpm for 20 mn to remove barite. Measurements of the electrical stability and density of the untreated muds and of PV and YP before and after treatment are shown in Table 1.

TABLE 1

Properties of field and laboratory OBMs

| | API Electrical Stability (untreated) (V) | Density (untreated) (g/ml) | PV (untreated) | PV (treated) | YP (untreated) | YP (treated) |
|---|---|---|---|---|---|---|
| Versaclean 1 | 517 | 1.45 | 78 | 69 | 37 | 32 |
| Versaclean 2 | 435 | 1.455 | 58 | 52 | 30 | 25 |
| Versaclean 2 Barite-free | 449 | 1.025 | 39 | 32.5 | 28 | 27.5 |

Thus the PV and YP of all the Versaclean OBMs were reduced by the treatment.

Figure 4:
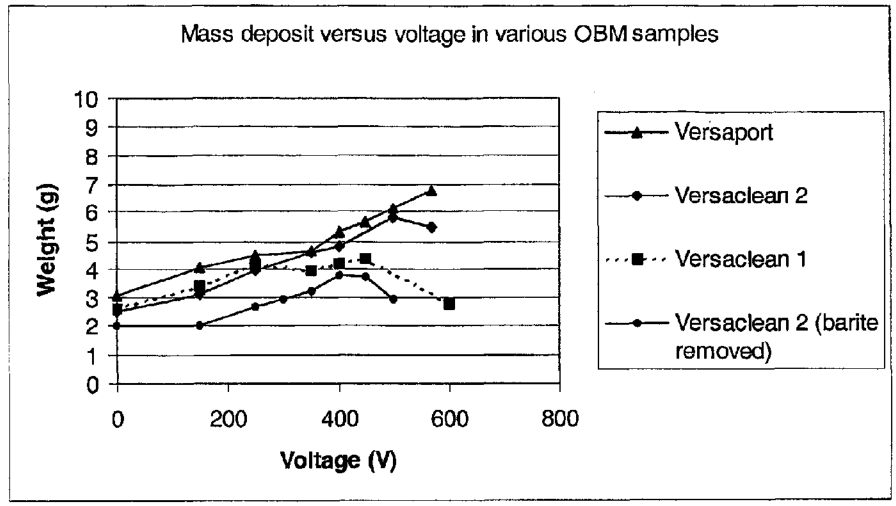
FIG. 4 shows a further graph of mass of deposit against voltage.

FIG. 4 shows a graph of the mass of the electrodeposit against voltage for each of the OBMs, including the Versaport OBM. This shows that the electrodeposit mass depends on the density of the mud, suggesting that the fine particles attracted to the negative electrode tend to trap the barite. The graph also shows that high voltages do not necessarily provide a greater electrodeposit. For all the field muds the electrodeposit mass reached a maximum between 450 to 500 V. The collection process becomes less efficient as the applied voltage approached the breakdown voltage of the API Electrical Stability test (API 1988), possibly owing to a drop in the electric field experienced by the oil phase as chains of emulsion droplets begin to form prior to dielectric breakdown (Growcock et al. 1994).

Non-Ohmicity and Time-Dependence

Figure 5:
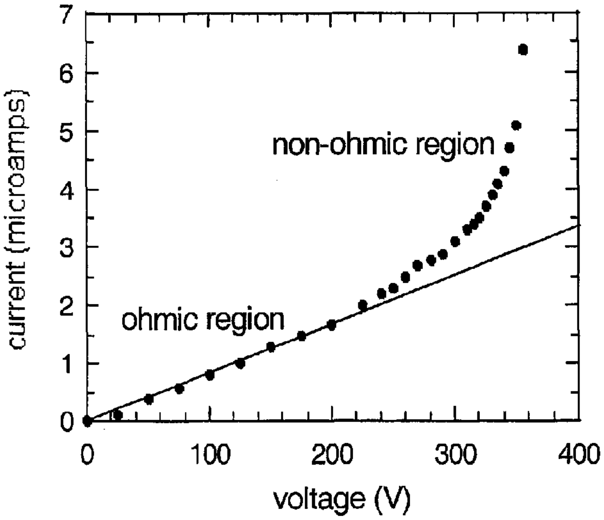
FIG. 5 shows a graph of current against voltage.

Using the apparatus of FIG. 2 electrophoretic separation was performed on Versaclean OBM for various times and voltages and the current measured. FIG. 5 shows a graph of current against voltage. The current was observed to increase with voltage in typical ohmic behavior up to 200 V but at higher voltages there was a clear non-ohmic and time-dependent behavior. This suggests a complex conduction mechanism which corresponds with the observation that as the applied voltage approaches the breakdown voltage progressively less deposit is collected on the negative electrode. These results again suggest that the electrodeposition process is more effective at voltages less than the breakdown voltage of the API Electrical Stability test (API 1988).

In tests on Versaclean, the total solids content by weight in the deposit was found to be about 64% wt while that of the mud was 57% wt, showing that the deposit solids were more concentrated than in the drilling fluid. Similarly, the electrodeposit yield stress was about five times that of the untreated mud, suggesting that the deposit had more fine clay particles than the mud.

Measurements of the concentration by weight of metal species in the deposit and mud were made using inductively-coupled plasma metal analysis, and the results are shown in Table 2.

TABLE 2

| Elemental analysis of deposit and mud | | | | | |
|---|---|---|---|---|---|
| | Al/Ba | Al/Cl | Al/C | Al/Ca | Ba/C |
| Mud | 0.185 | 0.356 | 0.025 | 0.207 | 0.136 |
| Deposit | 0.21 | 0.487 | 0.034 | 0.208 | 0.16 |
| Deposit/mud % increase | 15% | 37% | 36% | 0% | 18% |

Assuming the clay to be the only source of Al, the ratios of Al to Ba, Cl and C suggest that the deposit has gained significantly in clay. The null change in Al/Ca suggests that some Ca may be bonded to the clay, and the 18% increase in the Ba/C ratio shows that there was less oil in the deposit.

Effect of Shear on Field Mud (Versaclean)

The effect of shear on the electrodeposition process was investigated using a modified Chan 35™ oilfield rheometer in which the outside of the rotor was electrically-isolated from the rheometer body and acted as one electrode, while a brass cup of inner diameter 57 mm was inserted into a heat cup to act as the rheometer stator and also the other (earthed/grounded) electrode. In this configuration the drilling fluid could be sheared in the gap between the rotor and stator and the deposit could be collected on the outside of the rotor. The rotor gave a larger collection surface area than the annular electrode of the epoxy cell of FIG. 2, while allowing the mud to be sheared and/or heated simultaneously with the electric field applied.

Figure 6:
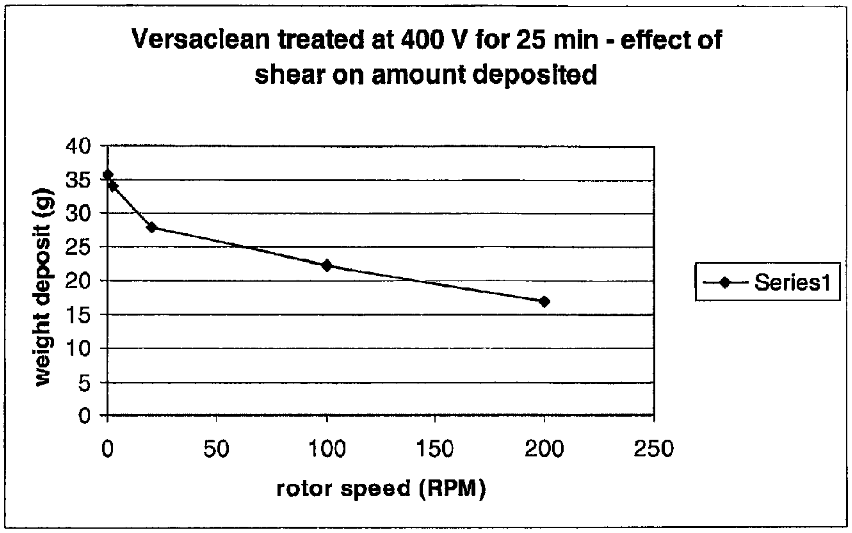
FIG. 6 shows a graph of deposit weight against rotor speed.

Using the Chan rotor R1 outer diameter of 40.65 mm and a brass cup inner diameter of 57.00 mm gave a laminar shear rate per unit RPM at the surface of the rotor of 0.43 $s^{-1}$/RPM. The results are shown in Table 3. Some results are also plotted on FIG. 6, which is a graph of deposit weight against rotor speed. FIG. 6 demonstrates that the effect of shear was to reduce the amount of deposit.

TABLE 3

Effect of shear, voltage, and time on electrodeposit mass for field Versaclean OBM

| Rotor speed (RPM) | Applied voltage (V) | Treatment time (min) | Deposit weight (g) | PV post-treatment | YP post-treatment |
|---|---|---|---|---|---|
| 0 | 0 | 0 | — | 58 | 30 |
| 200 | 0 | 25 | — | 52 | 27 |
| 200 | 0 | 100 | — | 45.5 | 30 |
| 0 | 40 | 250 | 32.7 | 43 | 23 |
| 0 | 400 | 40 | 41.60 | 30 | 11 |
| 0 | 400 | 25 | 35.72 | 37 | 16 |
| 20 | 400 | 25 | 27.8 | 36 | 26 |
| 100 | 400 | 25 | 22.29 | 45 | 15 |
| 200 | 400 | 25 | 16.72 | 48 | 18 |
| 200 | 400 | 40 | 19.59 | 40 | 18 |
| 200 | 400 | 60 | 23.29 | 41 | 7 |

These results, together with a range of tests on samples of used field Versaclean OBM and lab Versaport OBM may be summarized as follows:

With no shear, the longer the exposure to the electrical field, the greater the amount of deposit and the lower PV and YP.

The deposit weight increases with both time and voltage in both static and sheared tests. The very low voltage test over a long time (40V at 250 min) produced a similar deposit to 400 V at 25 min.

PV and YP were reduced as the deposit increased.

Elemental analysis after treatment of the Versaport mud indicated that the electro-deposit was enriched in Ba, Ca, Al, Na, Cl and depleted in organics (C, H, N) compared to the original mud. The reverse was found in the treated mud, confirming solids-removal from the fluid.

Shear reduced the mass of electro-deposit (see FIG. 6) and the effect of electro-treatment on the rheology. Sheared electro-deposits were also more fluid than static electro-deposits.

Combinations of static and sheared periods of electro-treatment generally increased the electro-deposit. The order of imposition of electric field and shear appears to have an effect on rheology.

Reversal of the field polarity causes the deposit to detach from the electrode and slump to the bottom.

Other variations altering the sequence of electrical treatment and shear in two stages were attempted and the results are shown in Table 4. The mud was treated first for 25 min with an applied voltage of 400 V with no shear. Then the treated system was placed under a shear of 200 rpm for 25 min. The amount of deposit formed was higher and PV and YP was generally lower than that when the mud was subjected to a simultaneous electric field and shear. Reversing the order of this process resulted in a higher amount of material being deposited but also a higher PV and YP.

TABLE 4

Two phase test conditions and results of experiments investigating effect of a treatment combining shear and voltage on weight of deposit, PV and YP (Versaclean field-OBM)

| Rotor speed (RPM) | | Applied voltage (V) | | Time (mn) | | Deposit | | |
|---|---|---|---|---|---|---|---|---|
| Phase 1 | Phase 2 | Phase 1 | Phase 2 | Phase 1 | Phase 2 | weight (g) | PV (treated) | YP (treated) |
| 0 | 200 | 400 | 0 | 25 | 25 | 27.27 | 22 | 20 |
| 200 | 0 | 0 | 400 | 25 | 25 | 31.58 | 44 | 21 |
| 200 | 200 | 0 | 400 | 25 | 25 | 17.49 | 43 | 20 |

Effect of Temperature on Field Mud (Versaclean)

Figure 7:
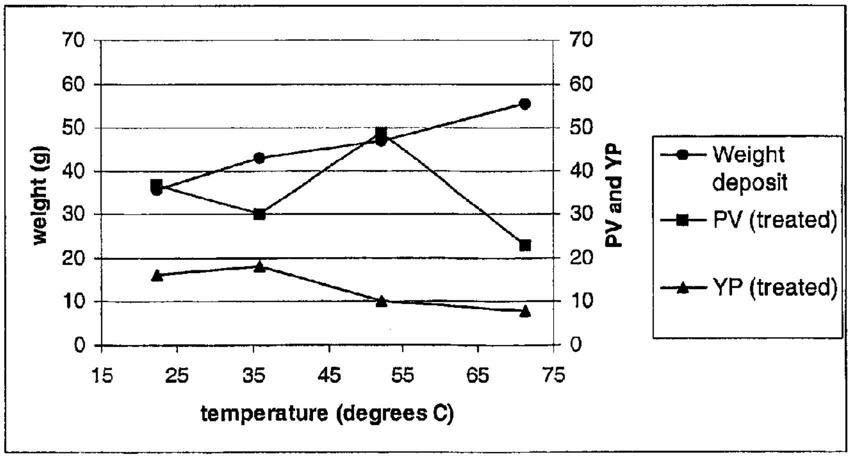
FIG. 7 shows a graph of deposit weight against test temperature.

FIG. 7 is a graph of deposit weight against test temperature obtained by testing the Versaclean OBM in the modified Chan rheometer. The effect of increasing the temperature, at a fixed voltage, was to usefully increase the weight of the deposit. Decreases in PV and YP, measured at laboratory temperature after treatment, are also shown in the graph.

Continuous-Flow and Batch Embodiments

The experiments described above show the utility of treating oil based drilling or completion fluids with an electric field. We now propose continuous-flow and batch embodiments that may be useful in full-scale or engineering applications. These serve to demonstrate the application of the invention but other examples are possible.

Figure 8:
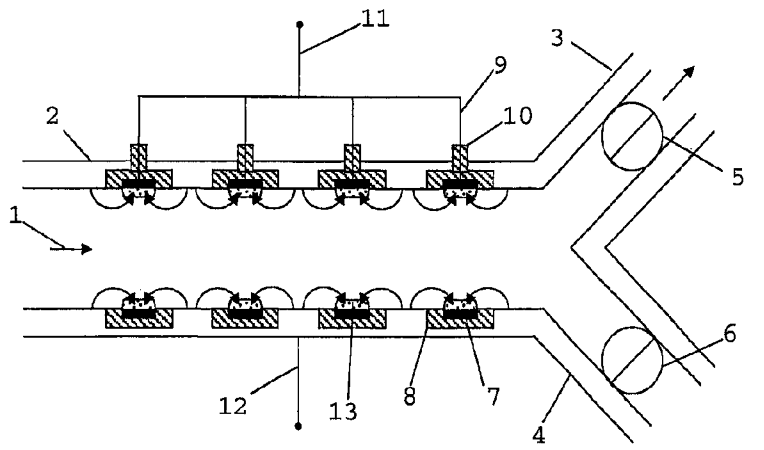
FIG. 8 shows schematically a longitudinal section through a device for recycling oil based mud.

FIG. 8 shows schematically a longitudinal section through a continuous-flow device for recycling used OBM. The drilling or completion fluid 1 enters an electrically-conductive and horizontal pipe 2, which bifurcates into pipe 3 and 4, each branch containing a valve 5 and 6. A series of annular electrodes 7 are held in pipe 2 and insulated from it by means of insulators 8. Electrical contact to each annular electrode is made via leads 9 and insulating bushes 10. Leads 11 and 12 respectively connect the electrodes and the pipe 2 to an electrical supply. In operation electrodeposit 13 forms on each of electrodes 7.

We have found (see above) that shear tends to reduce the efficiency of the deposition process. However, FIG. 6 shows that at sufficiently low shear rates, the efficiency is largely undiminished. For example, FIG. 6 shows that 10 RPM had little effect on the deposition rate. In our modified Chan 35 oilfield rheometer, 10 RPM corresponds to about 4.3 $s^{-1}$. For a pipe of diameter D, the relation between wall shear rate (WSR), volumetric flow rate (Q) and mean axial velocity (V) is $WSR=16V/(3D)=64Q/(3\pi D^3)$. This sets an upper limit on V and Q, in order that the deposition process is not unduly lessened. For example, for D=0.1 m and WSR=4.3 $s^{-1}$, V=0.22 m $s^{-1}$, approximately, which corresponds to about 100 l $min^{-1}$.

The device operates as follows. Deposit is collected on electrodes 7 with valve 5 open and valve 6 closed. Pipe 3 then exudes a drilling fluid with less fine particles than entered via pipe 2. After sufficient time (to be found by experiment and corresponding to a lessening deposition rate as the deposit intrudes into the body of pipe 2) valve 5 is closed, valve 6 is simultaneously opened, and the voltage applied to form the deposit is reversed. This pushes deposit into the body of pipe 2, where its greater density than the surrounding fluid causes it to be preferentially collected by pipe 4 and led into a suitable collection vessel.

Figure 9B:
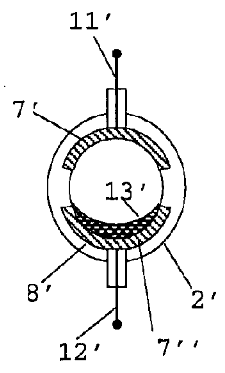
FIGS. 9*a* and *b* respectively show longitudinal and transverse sections of an alternative device for recycling oil based mud.
Figure 9A:
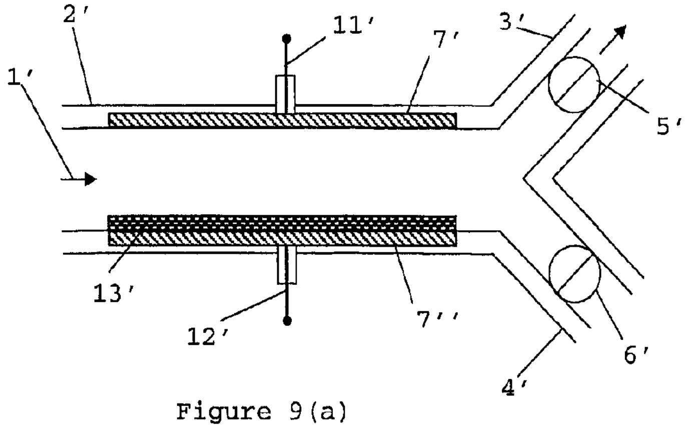

An alternative continuous-flow embodiment for such a device is shown in longitudinal section in FIG. 9*a* and in transverse section in FIG. 9*b*. In this case the drilling or completion fluid 1' enters a horizontal pipe 2' which is an electrical insulator. Pipes 3' and 4', with valves 5' and 6', resemble the bifurcation and valves of the device shown in FIG. 8. Electrodes 7' and 7'' now run axially along pipe 2', and are connected to a voltage source via leads 11' and 12', such that the electro-deposit 13' collects along the lower electrode 7'' over a suitable time period and voltage, both to be determined by experiment. Pipe 3' then exudes a fluid with less fine particles than entered via pipe 2'. After sufficient deposit is collected, the flow is stopped, valves 5' and 6' are closed and opened, respectively, the voltage is reversed, and the flow re-started. The re-start flow rate should be large enough to quickly remove the deposit, but not so large as to remix it with the incoming fluid. The deposit then exudes via pipe 4' and led to a suitable collection vessel.

The above two examples are illustrative of a variety of possible deposit removal systems, which may also include scraper-type devices or similar apparatus.

While the invention has been described in conjunction with the exemplary embodiments described above, many equivalent modifications and variations will be apparent to those skilled in the art when given this disclosure. For example, in batch embodiments the electrodes may be set into a stirred or a static tank. Accordingly, the exemplary embodiments of the invention set forth above are considered to be illustrative and not limiting. Various changes to the described embodiments may be made without departing from the spirit and scope of the invention.

REFERENCES

American Petroleum Institute (1988) Recommended practice standard procedure for field testing drilling fluids. API, Recommended Practice 13B (RP 13B), 12$^{th}$ Ed., Sep. 1, 1988.

Delgado A V (2002) Interfacial electrokinetics and electrophoresis. Marcel Dekker, New York.

Eow J S, Ghadiri M, Sharif A O, Williams T J (2001) Electrostatic enhancement of coalescence of water droplets in oil: a review of current understanding. Chem Eng J 84:173-192.

Growcock F B, Ellis C F, Schmidt D D (1994) Electrical stability, emulsion stability, and wettability of invert oil-based muds. SPE Drilling and Completion, March, 39-46.

Jones T B (1995) Electromechanics of particles. Cambridge University Press.

Pohl H A (1978) Dielectrophoresis. Cambridge University Press.

Thornton J D (1992) Science and practice of liquid-liquid extraction, Vol 1. Clarendon, Oxford.

The invention claimed is:

1. A method of removing particulate solids from an oil based drilling or completion fluid, wherein the fluid comprises a water-in-oil emulsion, the method comprising:

exposing the fluid to an electric field having a strength lower than that required to coalesce the water droplets of the emulsion to electrically migrate particulate solids suspended therein, and collecting the migrated particulate solids to remove them from the fluid.

2. A method according to claim 1, wherein the electric field has a strength less than 100,000 V/m.

3. A method according to claim 2, wherein the strength of the electric field is controlled such that current and voltage remain proportional to each other.

4. A method according to claim 3, wherein the fluid has a plastic viscosity (PV) and a yield point (YP), and wherein the plastic viscosity (PV) and/or the yield point (YP) of the fluid are reduced as a result of the collection of the particulate solids.

5. A method according to claim 1, wherein the fluid contains suspended particulate solids include clay particles.

6. A method according to claim 1, wherein the fluid contains suspended particulate solids include weighting agent particles.

7. A method according to claim 1, wherein the particulate solids in the fluid exposed to the electric field occupy at least 5 vol. % of the total fluid.

8. A method according to claim 7, wherein the fluid exposed to the electric field is a shear-thinning fluid which forms a gel when quiescent.

9. A method according to claim 1, further comprising:

heating the fluid to enhance the collection of particulate solids.

10. A method according to claim 1, including the step of using at least two electrodes to generate the electric field.

11. A method according to claim 1, including the step of using at least two electrodes to generate the electric field and a deposit removal system co-located with the electrodes.

12. A method according to claim 11, wherein deposit removal system is operated continuously or as a batch process.

13. A method according to claim 1, wherein the fluid exposed to the electric field is a shear-thinning fluid which forms a gel when quiescent.

14. A method of recycling an oil based drilling or completion fluid comprising:

exposing the fluid to an electric field having a strength lower than that required to coalesce the water droplets of the fluid to electrically migrate particulate solids suspended therein;

collecting the migrated particulate solids to remove them from the fluid; and using a centrifuge or hydrocyclone to remove other particulate solids from the fluid.

15. A method according to claim 14, further comprising: heating the fluid to enhance the collection of particulate solids.

16. A method according to claim 15, wherein the particulate solids in the fluid exposed to the electric field occupy at least 5 vol. % of the total fluid.

17. A method according to claim 16, wherein the fluid exposed to the electric field is a shear-thinning fluid which forms a gel when quiescent.

18. A method according to claim 16, wherein the strength of the electric field is less than 100,000 V/m.

19. A method according to claim 18, wherein the strength of the electric field is controlled such that current and voltage remain proportional to each other.

20. A method according to claim 19, wherein the fluid has a plastic viscosity (PV) and a yield point (YP), the plastic viscosity (PV) and/or the yield point (YP) being reduced as a result of the collection of the particulate solids.

* * * * *